US006580553B2

(12) United States Patent
Kim et al.

(10) Patent No.: US 6,580,553 B2
(45) Date of Patent: Jun. 17, 2003

(54) AUTOMATIC GAIN CONTROL DEVICE OF OPTICAL FIBER AMPLIFIER

(75) Inventors: Chan-Youl Kim, Kyunggi-do (KR);
Yun-Je Oh, Kyunggi-do (KR);
Seong-Taek Hwang, Kyunggi-do (KR);
Jun-Ho Koh, Kyunggi-do (KR)

(73) Assignee: Samsung Electronics Co., LTD, Suwon (KR)

( * ) Notice: Subject to any disclaimer, the term of this patent is extended or adjusted under 35 U.S.C. 154(b) by 0 days.

(21) Appl. No.: 10/046,355

(22) Filed: Jan. 14, 2002

(65) Prior Publication Data

US 2003/0011880 A1 Jan. 16, 2003

(30) Foreign Application Priority Data

Jul. 10, 2001 (KR) .............................. 10-2001-0041157

(51) Int. Cl.$^7$ ............................................... H01S 3/00
(52) U.S. Cl. ............................... 359/341.41; 359/341.4
(58) Field of Search ........................ 359/341.41, 341.4

(56) References Cited

U.S. PATENT DOCUMENTS 6,366,395 B1 * 4/2002 Drake et al. ............ 359/341.41
6,525,873 B2 * 2/2003 Gerrish et al. ............ 359/341.4

OTHER PUBLICATIONS

Kuniaki et al, "A Channel–Number Insensitive Erbium–Doped Fiber Amplifier With Automatic Gain and Power Regulation Function" (2001), IEEE Journal of Lightwave Technology, vol. 19, No. 11 pp 1759–1767.*

* cited by examiner

Primary Examiner—Mark Hellner
(74) Attorney, Agent, or Firm—Cha & Reiter

(57) ABSTRACT

An automatic gain control device of an optical fiber amplifier that outputs a compensation signal to control a gain value of the optical fiber amplifier is disclosed. The device includes: a first optical detector for partially converting an input optical signal to the optical fiber amplifier into a first electrical signal; a second optical detector for partially converting an output optical signal from the optical fiber amplifier into a second electrical signal; a first programmable amplifier having a first gain value set based on a first control signal, the first programmable amplifier inputting the first electrical signal and amplifying it at the first gain value to output a first amplified signal; a second programmable amplifier having a second gain value set based on a second control signal, the second programmable amplifier inputting the second electrical signal and amplifying it at the second gain value to output a second amplified signal; a proportional-integral derivative (PID) for outputting the compensation signal, the compensation signal corresponding to the difference between the power level of the first amplified signal and the power level of the second electrical signal; and, a controller for outputting the second control signal to the second programmable amplifier such that it has the second gain value based on a third gain value and for varying the first gain value of the first programmable amplifier until the first electrical signal and second amplified signal become the same in power level, thereby changing the gain value of the optical fiber amplifier to the third gain value.

8 Claims, 2 Drawing Sheets

AUTOMATIC GAIN CONTROL DEVICE OF OPTICAL FIBER AMPLIFIER

CLAIM OF PRIORITY

This application makes reference to and claims all benefits accruing under 35 U.S.C. Section 119 from an application for "Automatic Gain Control Device of Optical Fiber Amplifier," filed in the Korean Industrial Property Office on Jul. 10, 2001 and there duly assigned Serial No. 2001-41157.

BACKGROUND OF THE INVENTION

1. Field of the Invention

The present invention relates generally to an optical fiber amplifier and, more particularly, to a device for automatically controlling the gain of an optical fiber amplifier.

2. Description of the Related Art

In general, it is not easy to achieve gain flatness and a desired noise figure (NF) among channels in an optical fiber amplifier. In this regard, there has been a need for a gain control device to automatically keep the gains of channels flat despite a variation in the number of input channels or a variation in the intensity of an input optical signal. A conventional gain control method employing optical elements is effective, but has drawbacks in that the construction of an erbium-doped fiber amplifier (EDFA) is complex and difficult to tune the operating parameters of the EDFA to desired conditions based on the position of the EDFA. Another gain control method known in the prior art is achieved by controlling the amount of bias current to a pumping light source to adjust the intensity of pumping light therefrom. However, the optical fiber amplifiers often have different gain characteristics according to the type of pumping light sources, which do not match the gain characteristics desired by a user. For this reason, the user has trouble manually tuning the respective optical fiber amplifiers.

SUMMARY OF THE INVENTION

The present invention overcomes the above-described problems, and provides additional advantages by providing an automatic gain control device capable of automatically tuning the optical fiber amplifier to a desired gain value once the value is set by a user.

Accordingly, the automatic gain control device of an optical fiber amplifier includes a first optical detector for partially converting an input optical signal to the optical fiber amplifier into a first electrical signal; a second optical detector for partially converting an output optical signal from the optical fiber amplifier into a second electrical signal; a first programmable amplifier having a first gain value set based on a first control signal for inputting the first electrical signal and amplifying it at the first gain value to output a first amplified signal; a second programmable amplifier having a second gain value set based on a second control signal for inputting the second electrical signal and amplifying it at the second gain value to output a second amplified signal; a proportional-integral derivative (PID) for outputting the compensation signal corresponding to the difference between the power level of the first amplified signal and the power level of the second electrical signal; and, a controller for outputting the second control signal to the second programmable amplifier, such that it has the second gain value based on a third gain value and for varying the first gain value of the first programmable amplifier until the first electrical signal and second amplified signal become the same in the power level, thereby changing the gain value of the optical fiber amplifier to the third gain value.

BRIEF DESCRIPTION OF THE DRAWINGS

The above and other features and advantages of the present invention will be more clearly understood from the following detailed description taken in conjunction with the accompanying drawings, in which.

DETAILED DESCRIPTION OF THE PREFERRED EMBODIMENTS

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
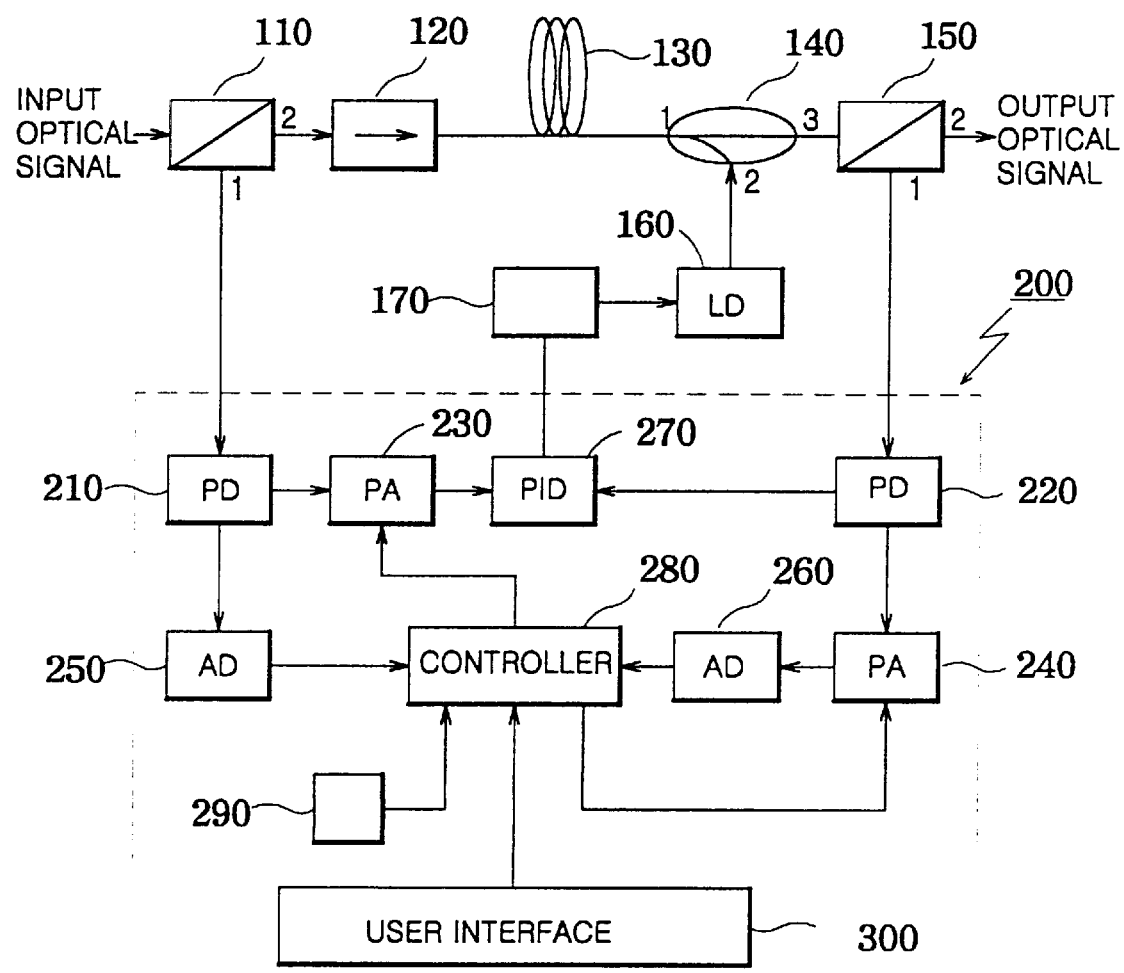
FIG. 1 is a block diagram showing the construction of an automatic gain control device of an optical fiber amplifier according to the present invention; and, FIG. 2 is a flow chart illustrating a method for automatically controlling the gain of the optical fiber amplifier according to the present invention.

FIG. 1 is a block diagram illustrating the construction of an automatic gain control device of an optical fiber amplifier according to a preferred embodiment of the present invention. In this drawing, the reference numeral 110 denotes a first beam splitter, 150 denotes a second beam splitter, 120 denotes an optical isolator, 130 denotes an erbium-doped fiber, 140 denotes an optical coupler, 160 denotes a pumping light source, 170 denotes a pumping light source driver, and 200 denotes the automatic gain control device of the present invention.

The first or second beam splitter 110 (or 150) inputs an optical signal and outputs a part thereof through its first terminal and the other part through its second terminal. The first and second beam splitters 110 and 150 are optical elements for splitting the intensity of the input optical signal in a desired ratio, which can be freely set by a user. Y-branched optical waveguides may be used as the first and second beam splitters 110 and 150.

The optical isolator 120 prevents light from traveling in an opposite direction to the input optical signal. Such light may be, for example, pumping light, reflected light, or the like.

The erbium-doped fiber 130 acts to amplify the input optical signal using an induced emission of excited erbium ions. The gain of the erbium-doped fiber 130 is controlled with the intensity of pumping light inputted thereto.

The pumping light source 160 emits pumping light of a specific wavelength. The intensity of the pumping light is controlled with a bias current applied to the pumping light source 160. The pumping light source 160 may include, for example, a laser diode, a laser light emitting diode, etc.

The pumping light source driver 170 outputs the bias current to the pumping light source 160 to drive it. The bias current is controlled with a compensation signal inputted to the pumping light source driver 170.

The optical coupler 140 inputs the amplified optical signal from the erbium-doped fiber 130 through its first terminal and outputs the amplified signal through its third terminal. Meanwhile, the optical coupler 140 inputs the pumping light from the pumping light source 160 through its second terminal and outputs the inputted light to the erbium-doped fiber 130. For the optical coupler 140, a wavelength-division multiplexer such as an arrayed waveguide grating may be used.

The automatic gain control device 200 comprises first and second optical detectors 210 and 220, first and second programmable amplifiers 230 and 240, first and second analog/digital converters 250 and 260, a proportional-integral derivative (PID) 270, a user interface 300, a controller 280, and a memory 290.

The first optical detector 210 converts the output optical signal from the first terminal of the first beam splitter 110 into a first electrical signal and outputs the first electrical signal to the first programmable amplifier 230 and the first analog/digital converter 250. A photodiode may be used preferably as the first optical detector 210.

Similarly, the second optical detector 220 converts the output optical signal from the first terminal of the second beam splitter 150 into a second electrical signal and outputs the second electrical signal to the PID 270 and second programmable amplifier 240.

The first programmable amplifier 230 sets a first gain value $A_1$ based on a first control signal from the controller 280. The first programmable amplifier 230 amplifies the first electrical signal from the first optical detector 210 at the set first gain value $A_1$ and outputs the resulting first amplified signal.

The second programmable amplifier 240 sets a second gain value $A_2$ based on a second control signal from the controller 280. The second programmable amplifier 240 amplifies the second electrical signal from the second optical detector 220 at the set second gain value $A_2$ and outputs the resulting second amplified signal.

The PID 270 generates the compensation signal, which corresponds to the difference between the power level of the first amplified signal and the power level of the second electrical signal, then outputs it to the pumping light source driver 170. In response to the compensation signal, the pumping light source driver 170 outputs the bias current to the pumping light source 160. The PID 270 is a type of feedback control system which takes the power level of the first amplified signal as a set value and the power level of the second electrical signal as a measured value, respectively, then outputs a compensation signal for the removal of the difference between these two values.

The first analog/digital converter 250 converts the first electrical signal from the first optical detector 210 into a digital signal and outputs the digital signal to the controller 280. The second analog/digital converter 260 converts the second amplified signal from the second programmable amplifier 240 into a digital signal and outputs the digital signal to the controller 280.

The user interface 300 is an element for receiving an input from a user. The user can enter data indicative of a desired third gain value $A_3$ of the optical fiber amplifier to the controller 280 via the user interface 300.

The controller 280 calculates the respective power levels of the first electrical signal from the first analog/digital converter 250 and the second amplified signal from the second analog/digital converter 260. Upon receiving, via the user interface 300, data instructing the change of the current gain value of the optical fiber amplifier to the third gain value $A_3$, the controller 280 outputs the second control signal to set the second programmable amplifier 240 to the second gain value $A_2$ based on the third gain value $A_3$. The controller 280 further varies the first gain value $A_1$ of the first programmable amplifier 230 until the first amplified signal and second electrical signal become the same in power level. When the power levels of the first electrical signal and second amplified signal eventually become the same, the controller 280 pauses to output the first control signal to the first programmable amplifier 230, then stores the first gain value $A_1$, second gain value $A_2$, and third gain value $A_3$ through the above procedure in the memory 290.

Figure 2:
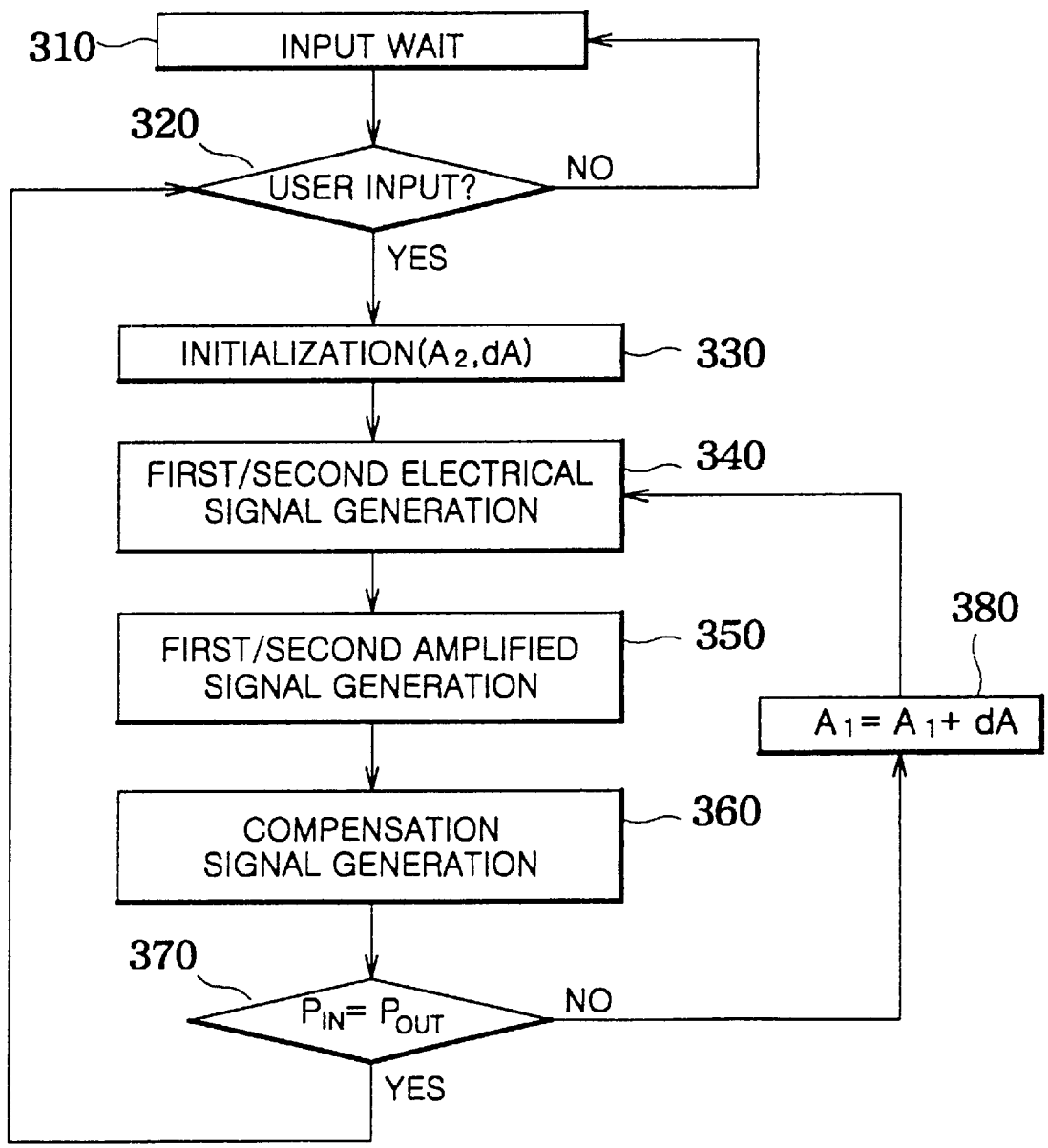

FIG. 2 is a flow chart illustrating a method for automatically controlling the gain of the optical fiber amplifier according to the present invention. The present automatic gain control method comprises an input wait step 310, user input determination step 320, initialization step 330, first/second electrical signal generation step 340, first/second amplified signal generation step 350, compensation signal generation step 360, input/output power comparison step 370, and loop variable increase step 380. A description will be given hereinafter of the present method with reference to FIGS. 1 and 2.

The input wait step 310 and user input determination step 320 are performed to maintain the settings of the optical fiber amplifier as they are until data is received through the user interface 300 and prepare an automatic gain control procedure in response to the data received, as will be described below.

At the initialization step 330, the third gain value $A_3$ indicated by the data from the user interface 300 is stored in the memory 290, and the second control signal is outputted such that the second programmable amplifier 240 has the second gain value $A_2$ corresponding to the third gain value $A_3$. In response to the second control signal, the second programmable amplifier 240 adjusts its gain value to the updated second gain value $A_2$. In addition, an increment/decrement dA is set for a repetitive loop of the first/second electrical signal generation step 340, first/second amplified signal generation step 350, compensation signal generation step 360, and input/output power comparison step 370. A description will be given of an example where power levels of the first electrical signal output from the AD250 and the first amplified signal from the PA230 are initially set to be 0 dBm, the third gain value $A_3$ to be 20 dBm, the second gain value $A_2$ to be −20 dBm, and the increment/decrement dA to be 1 dBm. The increment/decrement dA may be set freely. However, the second gain value $A_2$ is determined based on the third gain value $A_3$. In this example, the second gain value $A_2$ is considered to be −(third gain value $A_3$).

The first/second electrical signal generation step 340 is performed to convert the input and output optical signals into the first and second electrical signals, respectively, using the first and second beam splitters 110 and 150 and the first and second optical detectors 210 and 220.

The first/second amplified signal generation step 350 is performed to output the first and second amplified signals, which are generated by amplifying the first and second electrical signals, respectively, with the first and second programmable amplifiers 230 and 240. The power levels of the first electrical signal output from the AD250 and second amplified signal output from the AD260 are 0 dBm and −20 dBm, respectively. The first amplified signal output from the PA230 and the second electrical signal output from the PD220, both inputted to the PID 270, have the same power level, 0 dBm. Therefore, there is no difference between the power levels of the first amplified signal and the second electrical signal.

At the compensation signal generation step 360, the PID 270 generates a compensation signal corresponding to the difference between the power level of the first amplified signal from the PA230 and the power level of the second electrical signal from the PD220. This example, however, does not generate the compensation signal as there is no difference between the power levels of the first amplified signal and the second electrical signal.

The input/output power comparison step 370 is performed to compare the power levels of the first electrical signal and the second amplified signal inputted to the controller 280. As described above, the power levels of the first electrical signal output from the AD250 and the second amplified signal output from the AD260 are 0 dBm and −20 dBm, respectively, thus there is a difference of −20 dBm between the input and output power levels. Namely, the input and output power levels are not equal. If the input and output power levels are the same, the controller 280 sets the first gain value A, with the third gain value $A_3$ in the memory 290, then returns to the above user input determination step 320.

The loop variable increase step 380 is performed to increase/decrease the first gain value $A_1$ by the set increment/decrement dA when the input and output power levels are not equal. In this example, the increment/decrement dA is 1 dBm and, therefore, the first gain value $A_1$ increases from 0 dBm to 1 dBm. The controller 280 outputs the first control signal to the first programmable amplifier 230 to increase the first gain value $A_1$.

Thereafter, the power level of the first amplified signal becomes 1 dBm, whereas the power level of the second electrical signal is held constant at 0 dBm. In this case, the PID 270 outputs a compensation signal to remove the difference of 1 dBm. Note that the power level of the second electrical signal increases as the intensity of the pumping light increases. To this end, the pumping light source driver 170 increases the amount of bias current to be applied to the pumping light source 160 in response to the compensation signal from the PID 270.

Then, the first/second electrical signal generation step 340, first/second amplified signal generation step 350, compensation signal generation step 360, input/output power comparison step 370, and loop variable increase step 380 are repeated until the levels of the input and output power applied to the controller 280 become the same.

After the above procedure is completed, the power levels of the first and second electrical signals and the first and second amplified signals are 0 dBm, 20 dBm, 20 dBm, and 0 dBm, respectively. Consequently, the gain value of the optical fiber amplifier becomes 20 dBm, which is equal to the third gain value $A_3$ desired by the user.

Assuming that the power level of an input optical signal to the optical fiber amplifier set through the above procedure is decreased by −3 dBm, the power levels of the first and second electrical signals decrease by half, respectively. It is noted that the gain value of the optical fiber amplifier is 20 dBm (17 dBm−(−3 dBm)); namely, it is maintained as it is.

As apparent from the above description, the present invention provides an automatic gain control device of an optical fiber amplifier which is capable of automatically tuning the optical fiber amplifier to a desired gain value once the value is set by a user.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed:

1. An automatic gain control device of an optical fiber amplifier which outputs a compensation signal to control a gain value of the optical fiber amplifier, said device comprising:
    a first optical detector for partially converting an input optical signal to said optical fiber amplifier into a first electrical signal;
    a second optical detector for partially converting an output optical signal from said optical fiber amplifier into a second electrical signal;
    a first programmable amplifier having a first gain value set based on a first control signal, said first programmable amplifier amplifying said first electrical signal at said first gain value to output a first amplified signal;
    a second programmable amplifier having a second gain value set based on a second control signal, said second programmable amplifier amplifying said second electrical signal at said second gain value to output a second amplified signal;
    a proportional-integral derivative (PID) for outputting said compensation signal, corresponding to a difference between the power level of said first amplified signal and the power level of said second electrical signal; and,
    a controller for outputting said second control signal to said second programmable amplifier to set said second gain value to a third gain value and for varying said first gain value of said first programmable amplifier until said first electrical signal and second amplified signal become the same in power level, so that the gain value of said optical fiber amplifier changes to said third gain value.

2. The device of claim 1, further comprising:
    a first analog/digital converter for converting said first electrical signal from said first optical detector into a digital signal for transmission to said controller; and,
    a second analog/digital converter for converting said second amplified signal from said second programmable amplifier into a digital signal for transmission to said controller.

3. The device of claim 1, further comprising a user interface for receiving data indicative of said third gain value from a user.

4. The device of claim 1, further comprising a memory for storing said first, second, and third gain values.

5. A method for controlling the gain of an optical fiber amplifier, the method comprising the steps of:
    (a) converting an input optical signal of said amplifier to a first electrical signal and an output optical signal of said amplifier to a second electrical signal;
    (b) amplifying said first electrical signal at a first predefined gain level to generate a first amplified signal and said second electrical signal at a second predefined gain level to generate a second amplified signal;
    (c) upon receiving a user's request to adjust the gain of said amplifier, setting said second predefined gain to a desired gain;
    (d) comparing the power level of said first amplified signal to said second electrical signal;
    (e) if there is a difference in said compared power level, adjusting said first predefined gain level at a predetermined increment; and,
    (f) amplifying said first electrical signal at said adjusted first predefined gain level.

6. The method of claim 5, further comprising the steps of:

comparing the power output of said amplified first electrical signal in step (f) and said second amplified signal;

generating a compensation signal when there is a difference between the power output of said amplified first electrical signal in step (f) and said second amplified signal; and, amplifying said input signal according to said compensation signal to remove said power level difference.

7. The method of claim 5, wherein said first predefined gain level is adjusted continuously at said predetermined increment so that the power level between said first amplified signal to said second electrical signal becomes equal.

8. The method of claim 5, further comprising the step of storing said desired gain as said first predefined gain level in a memory medium when there is no difference in said compared power level.

* * * * *